United States Patent

[11] 3,622,076

| [72] | Inventor | Forrest W. Streeter<br>Madison, Ala. |
|---|---|---|
| [21] | Appl. No. | 788,736 |
| [22] | Filed | Jan. 3, 1969 |
| [45] | Patented | Nov. 23, 1971 |
| [73] | Assignee | Thiokol Chemical Corporation<br>Bristol, Pa. |

[54] VARIABLE AREA NOZZLE
2 Claims, 6 Drawing Figs.

[52] U.S. Cl. .................................................... 239/265.43
[51] Int. Cl. ........................................................ B64c 15/06
[50] Field of Search ............................................ 239/265.37, 265.43

[56] References Cited

UNITED STATES PATENTS

| 2,978,866 | 4/1961 | Clark .......................... | 239/265.37 |
| 3,046,730 | 7/1962 | Petren ......................... | 239/265.39 |
| 3,229,457 | 1/1966 | Rowe et al. .................. | 239/265.37 |

FOREIGN PATENTS

| 597,526 | 5/1960 | Canada ....................... | 239/265.43 |

*Primary Examiner*—Samuel Feinberg
*Attorney*—William R. Wright

ABSTRACT: A segmental nozzle having hydraulic actuating systems to move the segments to vary the outer circumference of the nozzle and the throat area of the nozzle to provide thrust modulation of the solid propellant rocket motor to which the segmental nozzle is secured.

Forrest W. Streeter INVENTOR.

BY
ATTORNEY

Forrest W. Streeter INVENTOR.

BY

ATTORNEY

VARIABLE AREA NOZZLE

BACKGROUND OF THE INVENTION

1. Field of the Invention

It is a well-known fact that solid propellant rocket motors have severe problems in throttleability during flight of such rocket motors. One of the reasons for such problem is the fact that once the solid propellant has been ignited, it will burn at a steady rate unless the combustion environment of the rocket motor can be changed. The ability, however, to change the combustion environment of the rocket motor on command is hampered by the high combustion temperatures created by the burning of the solid propellant in the rocket motor.

If moving parts to obtain combustion environment are located in a nozzle through which the exhaust stream from the rocket exits, then such moving parts must be thoroughly insulated or of a size to absorb the heat and erosion and maintain structural integrity to prevent destruction of such moving parts.

The instant invention achieves variable area nozzle throats of the nozzle to obtain any desired variations in combustion environment without the positioning of any moving parts in the exhaust stream exiting from the nozzle.

2. Description of the Prior Art

Various concepts of variable nozzles for use with aircraft engines have been achieved, but some of the problems with such concepts is the restricted space that is available for mounting the actuating mechanism for operating such nozzles and also, as previously stated, the manner in which such actuating mechanisms are mounted to relieve stresses set up in the actuating mechanisms that are created by the flow of exhaust gases through the nozzle. The instant invention overcomes these problems by being able to mount the actuating mechanism in a restricted area and not in the exhaust gases exiting through the nozzle.

SUMMARY OF THE INVENTION

The invention relates to variable area nozzles and more particularly to the mechanism for actuating such variable area nozzles to provide thrust modulation for a solid propellant rocket motor.

The basis on which the instant invention is founded involves the operation of an iris or camera aperture, which produces an opening for the lens of the camera. The operation of the iris is governed by overlapping leaves or segments that simultaneously move back and forth in parallel equal relation to each other to open and close the opening or orifice for the lens of the camera. It may be said that the manner of operation of the variable area nozzle is performed in the same manner.

The variable area nozzle comprises a plurality of longitudinally extending segments that move simultaneously in parallel equal relation to each other to increase or decrease the circumference of the nozzle and thus increase or decrease the throat area of the nozzle in somewhat the same manner as the opening for the lens of the camera is increased or decreased.

In one form of the invention the longitudinally extending edges of the segments of the variable area nozzle are in overlapping relation to each other and in another form of the invention tongue and groove connections are provided along the longitudinal edges of the segments and both the overlapping edges and the tongue and groove connections prevent leakage of combustion gases from the nozzle during the operation of the solid propellant rocket motor on which the variable area nozzle has been mounted.

Movement of the segments of the variable area nozzle is accomplished by a specially designed mechanism that is not subjected to the flow of the combustion gases and the mechanism is minimized in size and parts to be able to be contained in a restricted area on the variable area nozzle. It is also stipulated to provide a mechanism that is regulated to move the segments to permit chamber pressure within the solid propellant rocket motor to vary the throat area and exhaust area of the nozzle, it being understood that there is radial movement of the segments in both directions to either close the segments or open them.

The variable area nozzle is not only applicable for solid propellant rocket motors, but it may also be applicable to integral boosters as well as air augmented ducted rockets and to include thrust modulation of such rockets during operational flight thereof.

An object of the invention, therefore, is to provide a variable area nozzle and means for the actuation thereof which is capable of being mounted in a restricted area.

Another object of the invention is to provide means for actuating a variable nozzle which is mounted so that it will not be affected by the intensive heat created by the combustion gases resulting from the burning of a solid propellant in a rocket motor.

A further object of the invention is to provide a variable area nozzle which will provide thrust vector control for the solid propellant rocket motor on which the variable area nozzle is mounted.

With the above and other objects and advantages in view as may appear to one skilled in the art, this invention consists of the novel details of construction, arrangement and combustion of parts more fully hereinafter described, claimed and illustrated in the accompanying drawings in which:

DESCRIPTION OF THE PREFERRED EMBODIMENTS

Figure 1:
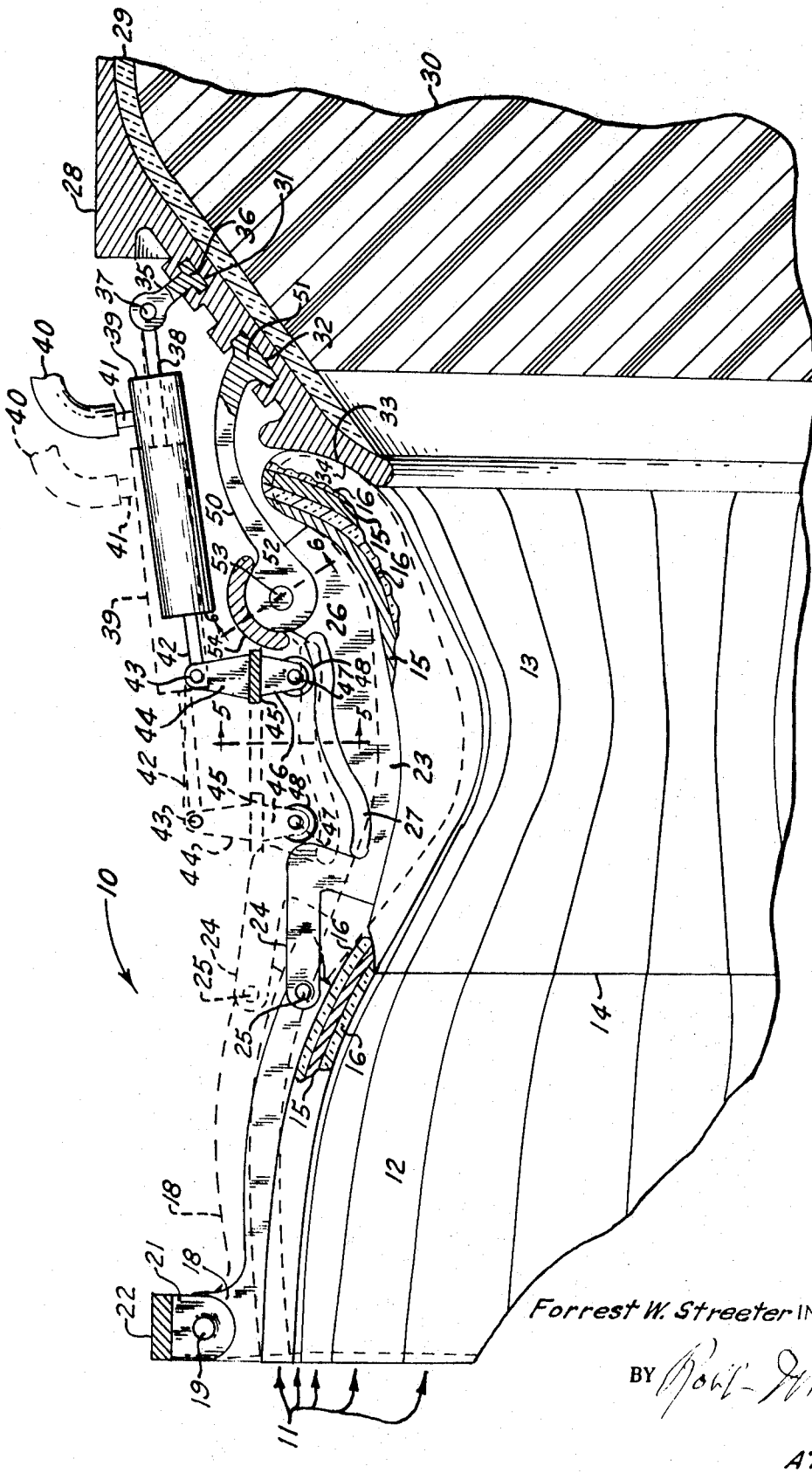
FIG. 1 is a schematic view, partly in elevation, partly in section and partly broken away of one form of variable area nozzle embodying the invention.

Referring more in detail to the drawings, wherein like parts are designated by like reference numerals, the reference numeral 10 is used to generally designate one form of variable area nozzle embodying the invention.

Referring more in detail to FIGS. 1, 3, 5 and 6 wherein one form of the variable area nozzle 10 is illustrated, it will be noted that the variable area nozzle 10 comprises a plurality of segments 11 which comprise an aft portion 12 and a forward portion 13 which terminates at a circumferential demarcation line 14. It is to be noted that sealing means are to be utilized at the meeting edges of the portions 12 and 13 of the segments 11.

Figure 3:
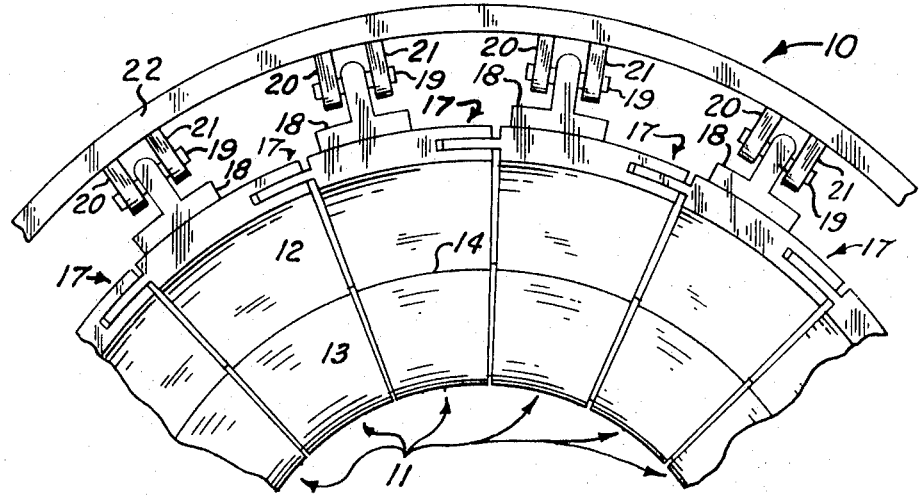
FIG. 3 is a view similar to FIG. 2 showing the aft end of the nozzle of FIG. 1.

The portions 12 and 13 of the segments 11 are of laminated construction comprising one or more metal layers 15 with outer or alternate layers of insulation 16. As shown in FIG. 3, tongue and groove connections 17 are provided between the longitudinally extending edges of the segments 11. Such connections 17 prevent leakage between the segments 11 of the variable area nozzle 10.

The insulation 16 may be of the molded type, also filament wound material may be used where the material is cut to the appropriate size of the segments 11 and then finally machined to the desired shape to include the tongue and groove connections 17 or the lap joint construction, as will be later described and shown in FIG. 2. The insulation materials used in either form of the invention are the type used in jet engine nozzles that endure a minimum of 150 hours at 2,500° F. with or without intermittent cool downs as is usual in jet engine operation.

A longitudinally extending T-shaped strengthening or reinforcing rib 18 is secured to the outer surface of each of the portions 12 of the segments 11 in any well-known manner and the aft end of each of the T-shaped ribs 18 is apertured to receive a pivot pin 19 which extends through a pair of parallel spaced lugs 20 and 21 that and secured to the inner surface of a circular restraining band 22 that encircles the aft ends of the segments 11. In this form of the invention the restraining band 22 prevents enlargement of the circumferential area of the aft or exhaust end of the variable area nozzle 10.

A longitudinally extending T-shaped strengthening or reinforcing rib 23 is also secured to the outer surface of each of the portions 13 of the segments 11 in any well-known manner and each of the ribs 23 is provided with an apertured L-shaped connecting arm 24 that is connected by a pivot pin 25 to the apertured forward ends of the ribs 18 that are secured to the portions 12 of the segments 11. The forward end of each of the ribs 23 is provided with an enlarged apertured connecting boss 26 and a cam plate 27 is secured to the upper edge of each of the ribs 23 intermediate of the connecting arm 24 and the enlarged apertured connecting boss 26.

A circular nozzle connecting ring 28 is used for both forms of the invention and the connecting ring 28 is secured to a motor case, not shown, and becomes the aft end of the motor case so that when insulation 29 is bonded into the motor case, it covers and protects the inner surface of the connecting ring 28, as shown in FIG. 1 and a solid propellant 30, when cast into the motor case terminating within the insulated area of the connecting ring 28 also as shown in FIG. 1.

The connecting ring 28 is provided with a plurality of substantially T-shaped open ended sockets 31 and a plurality of substantially T-shaped open ended sockets 32 and the free circumferential edge of the connecting ring 28 is contoured at 33 to conform to the configuration 34 of the forward end of each of the portions 13 of the segments 11. It is also to be noted that sealing means may be utilized between the coacting surfaces of the contour 33 and configuration 34 if found to be necessary.

Figure 5:
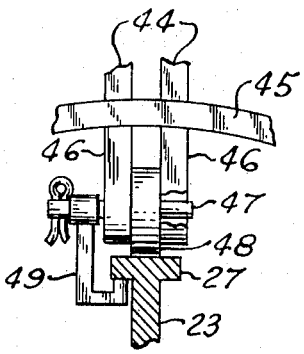
FIG. 5 is a view partly in elevation, partly broken away and partly in section and taken on the line 5—5 of FIG. 1.

A plurality of apertured studs 35 are provided that have T-shaped bases 36 that are slid into the T-shaped open ended sockets 31 to retain them in substantially fixed relation to the connecting ring 28. Each of the studs 35 is connected by a pivot pin 37 to a piston rod 38 that extends through one end of a hydraulic actuator 39 which is controlled by a fluid supply conduit 40 that is connected to a suitable hydraulic actuating system, not shown, the connection to the actuator 39 of the supply conduit 40 being made by means of a nipple 41 that is connected to and has communication with the interior of the hydraulic actuator 39. An apertured connecting rod 42 extends from the opposite end of the hydraulic actuator 39 in axial alignment therewith and is connected by a pivot pin 43 to a pair of parallel spaced apertured ears 44 that are rigidly secured to a circular collecting ring 45, as shown in FIGS. 1 and 5.

Depending below the circular collecting ring 45 and rigidly secured thereto in axial alignment with the ears 44 are a second pair of parallel spaced apertured ears 46. A pin 47 extended through the apertured ears 46 transversely thereof, journals thereon a roller 48 that has contactual rolling relation with the cam plate 27 on the ribs 23, and a restraining hook formation 49 mounted on an extended end of the pin 47 engages the undersurface of the cam plate 27 to prevent loss of contact between the cam plate 27 and the roller 48 and for another purpose to be later described in the operation of the variable area nozzle 10.

Figure 6:
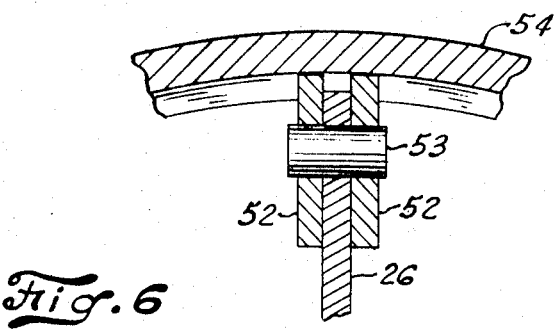
FIG. 6 is a view similar to FIG. 5 and taken on the line 6—6 of FIG. 1.

A plurality of curved apertured arms 50 are provided that have T-shaped bases 51 that are slid into the T-shaped open ended sockets 32 to retain them in substantially fixed relation to the connecting ring 28. Each of the apertured arms 50 are provided with an enlarged rounded forked end 52 about the apertures therein and the forked end 52 is connected by a pivot pin 53 to opposite sides of the apertured connecting boss 26 on the forward end of each of the ribs 23, as shown in FIG. 6.

The forked ends 52 of each of the arms 50 have contactual sliding relation with a second circular restraining band 54 that is contoured to have positive contactual relation with each of the forked ends 52 for a purpose to be later described.

Figure 2:
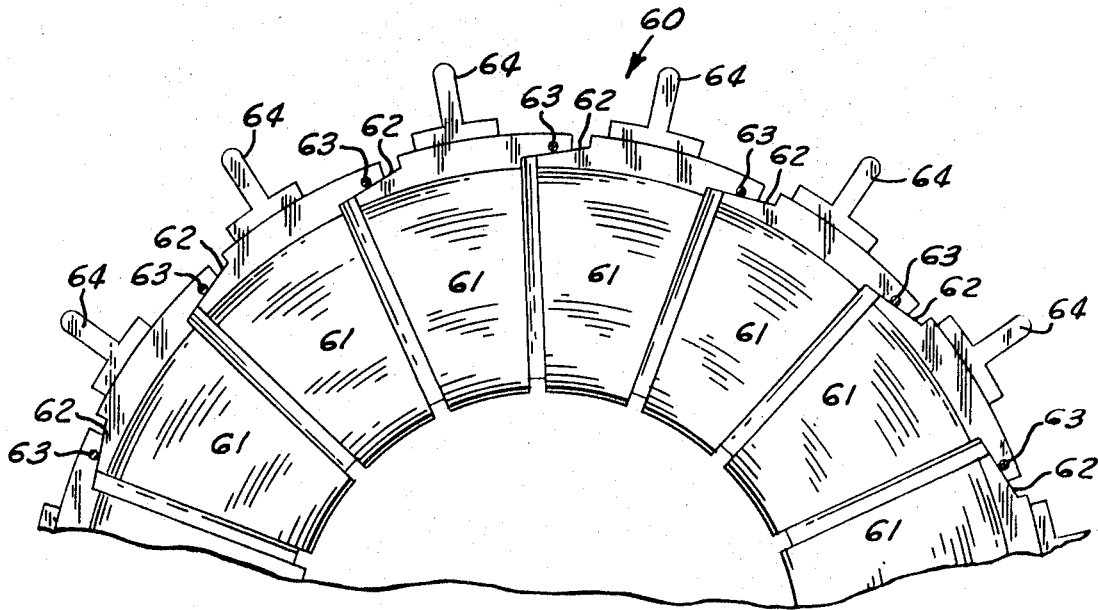
FIG. 2 is a schematic view, partly broken away of the aft end of another form of the variable nozzle embodying the invention.
Figure 4:
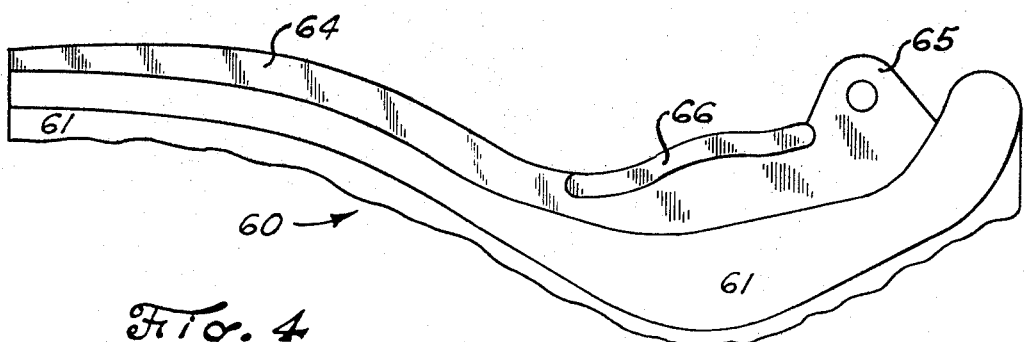
FIG. 4 is a schematic view of another form of segment of the variable area nozzle than that shown in FIG. 1.

In FIGS. 2 and 4, another form of the invention is shown and the assembly of the variable area nozzle 60, shown partially in FIG. 2, comprises a plurality of unitary segments 61 which, like the segments 11, are also of laminated construction and are assembled in the same manner as to the different materials that constitute the different layers to form the laminated structure, as previously described.

As shown in FIG. 2, lap joints 62 are provided between the longitudinally extending edges of the segments 61 and such joints prevent leakage between the segments 61 of the variable area nozzle 60 by reason of the O-rings 63 that are installed in one overlapping member of the lap joints 62.

A longitudinally extending T-shaped strengthening or reinforcing rib 64 is secured to the outer surface of each of the segments 61 in any well-known manner and the forward ends of each of the ribs 64 is provided with an enlarged apertured connecting boss 65 and a cam plate 66 is secured to the upper edge of each of the ribs 64 adjacent to the enlarged apertured connecting boss 65.

It is to be noted that, except for the fact that the segments 61 of the variable area nozzle 60 are unitary, the operation and arrangement of components of this form of the invention is substantially the same as the operation and arrangement of components of the form of the invention shown in FIGS. 1, 3, 5 and 6.

In the operation of all forms of the variable area nozzle, it is to be understood that the contour of the nozzle may be variable, but the nozzle exit is fixed as in FIGS. 1, 3, 5 and 6 or the contour of the nozzle may be fixed, but the nozzle exit may be variable as shown in FIGS. 2 and 4.

In the form of the invention shown in FIGS. 1, 3, 5 and 6, the restraining band 22 retains the contour of the nozzle exit fixed, but variation of the contour of the nozzle and the throat area thereof may be varied by the action of the circular collecting ring 45. As previously described, a roller 48 is connected to the collecting ring 45 and there is a roller 48 for each one of the forward portions 13 of the segments 11 and the rollers 48 have contactual rolling engagement with the cam plate 27 on each of the ribs 23 on the forward portions 13. Thus, as movement of the collecting ring 45 is accomplished by means of the hydraulic actuator 39 that moves the collecting ring 45 aft toward the nozzle exit as shown in dotted lines in FIG. 1 so that the chamber pressure of the solid propellant rocket motor to which the nozzle is connected will force the segments 11 radially outward so also shown by dotted lines in FIG. 1. This movement is accomplished by means of the pivotal connecting pins 19, 25 and 53. The position of the rollers 48 and their contact with the cam plates 27, determine the radial movements of the segments 11, thus the movement of the hydraulic actuator 39 to move the collecting ring 45 determines and varies the throat size of the nozzle and of course the contour thereof. The restraining hooks 49 engaging the under surface of the cam plates 27 prevent uncontrolled radial movement of the segments 11 so that the radial movement is no greater than that created by the actuation of the hydraulic actuator 39 and the rollers 48 and cam plates 27. The collecting ring 45 is made in sections that are bolted or otherwise secured together as it is positioned in circumjacent relation to the nozzle. Thus, the variations of the throat size and the variation of the contour of the nozzle is accomplished by movement of the hydraulic actuator 39 and the chamber pressure of the solid propellant rocket motor. The control of the hydraulic actuator 39 is accomplished by a suitable hydraulic system that is mounted on the skin frame of the solid propellant rocket motor. It may also be said that the distance from the nozzle exit to the pivot pin 25 determines the distance the portions 12 of the segments 11 will travel, thus the location of the pivot pin 25 will determine the exit area encompassed by the portions 12 and the variation of the nozzle throat as to the distance travelled by the portions 13 of the segments 11. The restraining band 54 engages the forked ends 52 of the arms 50 relieving the strain of the pivotal movement of the segments 11 on the pivot pins 53.

In FIGS. 2 and 4 the nozzle exit varies as to the radial movement of the unitary segments 61, thus the nozzle throat and nozzle exit may be varied as desired and the nozzle contour is not changed as the nozzle contour is changed as in FIGS. 1, 3, 5 and 6, but the form of the invention shown in FIGS. 2 and 4 is less complicated with fewer components.

Of course, it is to be understood that the ribs on the segments are used to reinforce the segments and prevent breakage thereof and the ribs also strengthen the laminated structure that as stated contains layers of insulation.

It is also possible to control thrust vector control by the use of a nozzle, as previously described, for certain hydraulic actuators can be controlled to cant the collecting ring and then cant the entire nozzle, because the segments on one side are shortened, while the ones on the opposite side are not affected or in effect lengthened.

The variable nozzle can be used on conventional solid propellant rocket motors and integral boosters as well as for an augmented ducted rocket for thrust modulation and an augmented operation. Since different size nozzle throats are required in some operational flights of booster rocket motors and afterburn operation, the variable area nozzle embodying the invention has a great advantage over a fixed nozzle having a fixed throat area, since the nozzle can operate in closed position during boost and in open variable positions during an augmented afterburner operation.

Having thus described the invention what is claimed as new and desired to be secured by Letters Patent is:

1. A variable area nozzle for the exhaust of the chamber pressure of a solid propellant rocket motor comprising a plurality of circumferentially arranged longitudinally extending segments defining an exhaust area and a throat area within the nozzle, a collecting ring mounted on said nozzle in circumjacent relation thereto, a cam plate mounted on each of said segments, rollers mounted on said collecting ring for engagement with said cam plate, means connecting said nozzle to said solid propellant rocket motor and provided with one of more T-shaped open-ended slots, pivot means for each of said segments, hydraulic means mounted on said connecting means and having T-shaped bases that are receivable in said T-shaped slots, and said hydraulic means connected to said collecting ring to move said ring longitudinally of said nozzle to adjust the relation of the rollers to said cam plate, whereby the chamber pressure of the solid propellant rocket motor will move the segments radially to vary the throat area of said nozzle.

2. A variable area nozzle for the exhaust of the chamber pressure of a solid propellant rocket motor comprising a plurality of circumferentially arranged longitudinally extending segments defining an exhaust area and a throat within the nozzle, a collecting ring mounted on said nozzle in circumjacent relation thereto, a plurality of restraining means connected to said collecting ring to engage said cam plates to limit the outward radial movement of said segments to limit the throat area, a cam plate mounted on each of said segments, rollers mounted on said collecting ring for engagement with said cam plate, hydraulic means connected to said collecting ring to move said ring longitudinally of said nozzle to adjust the relation of the rollers to said cam plate whereby the chamber pressure of the solid propellant rocket motor will move the segments radially to vary the throat area of said nozzle.

* * * * *